United States Patent [19]
Cookson et al.

[11] 4,105,859
[45] Aug. 8, 1978

[54] COMPARTMENTALIZED GAS INSULATED TRANSMISSION LINE

[75] Inventors: Alan H. Cookson, Southboro; George A. Kemeny, Sudbury; Philip C. Bolin, Northboro, all of Mass.

[73] Assignee: Westinghouse Electric Corp., Pittsburgh, Pa.

[21] Appl. No.: 720,330

[22] Filed: Sep. 3, 1976

[51] Int. Cl.² .............................................. H01B 9/04
[52] U.S. Cl. ................................ 174/14 R; 174/16 B; 174/28
[58] Field of Search ................. 174/11 R, 14 R, 28, 174/16 B, 111, 99 B, 88 B, 23 R

[56] References Cited

U.S. PATENT DOCUMENTS

| 3,515,909 | 6/1970 | Trump | 174/28 X |
| 3,786,174 | 1/1974 | Floessel | 174/16 B X |
| 3,814,830 | 6/1974 | Cronin | 174/28 X |
| 3,819,845 | 6/1974 | Tahiliani | 174/11 R |
| 3,898,367 | 8/1975 | Nakata | 174/14 R |
| 4,011,396 | 3/1977 | Van Deventer et al. | 174/11 R |
| 4,029,890 | 6/1977 | Nakata | 174/14 R |
| 4,029,892 | 6/1977 | Nakata | 174/14 R |

Primary Examiner—Arthur T. Grimley
Attorney, Agent, or Firm—M. S. Yatsko

[57] ABSTRACT

A gas insulated transmission line section wherein an inner conductor at high potential is located within an outer sheath at low potential. An insulating gas is disposed within the outer sheath to electrically insulate the inner conductor from the outer sheath. A support insulator is disposed within the outer sheath, and this support insulator supports the inner conductor in a spaced-apart relationship with the outer sheath. Included is a barrier insulator which also supports the inner conductor within the outer sheath. The barrier insulator substantially fills the cross-sectional area between the inner conductor and the outer sheath so as to prevent substantially all arc products and contamination produced in the unlikely event of a fault from migrating past the barrier insulator. By so preventing the migration of these products, the gas insulated transmission line section is effectively compartmentalized and these products cannot contaminate adjacent transmission line sections.

8 Claims, 4 Drawing Figures

COMPARTMENTALIZED GAS INSULATED TRANSMISSION LINE

BACKGROUND OF THE INVENTION

This invention relates generally to high voltage electrical transmission lines, and more particularly, to a compartmentalized gas insulated transmission line section.

Compressed gas insulated transmission lines are being used in an ever-increasing scale in recent years due to the desirability of increasing safety, their environmental acceptability, problems in acquiring right-of-way for overhead lines, higher power loads required by growing metropolitan areas and growing demands for electrical energy. Compressed gas insulated transmission lines typically comprise a hollow outer sheath, an inner conductor within the sheath, a plurality of insulating spacers which support the conductor, and a compressed gas such as sulfur hexafluoride or the like in the sheath to insulate the inner conductor from the outer sheath. The typical assembly has been fabricated from relatively short sections of hollow cylindrical ducts or tubes into which the conductor and insulators are inserted. This assembly is usually completed in the factory, and the sections are welded or otherwise secured together in the field to form transmission lines. It is also known to provide a particle trap in compressed gas insulated transmission lines as is disclosed in the patent to Trump, U.S. Pat. No. 3,515,939. The particle trap of Trump is utilized to allow conducting or semiconducting particles which could adversely affect the breakdown voltage of the dielectric gas to move from locations where such particles would cause breakdowns to locations where breakdown of the insulator gas is less likely to occur.

Problems have arisen, however, in the use of such compressed gas insulated lines. Occasionally, not all of the particles are captured in the particle traps, but contamination particles may sometimes collect on the insulating spacer surfaces and initiate high voltage flashover. To decrease the probability of this happening, it is desirable that the spacer surface area upon which the particles could collect be made as small as possible. This desire to minimize the surface area of the spacer has resulted in the use of post-type insulating spacers to support the inner conductor.

However, the use of such post-type spacers presents an additional problem; if, in the unlikely event of a failure in the line with resulting breakdown and arcing, arc products or contamination may occur, and this contamination and arc product can migrate from the section of the transmission line where they occurred to adjacent sections. This movement of arc products and contamination throughout the transmission line may then cause subsequent substantial damage. One manner of avoiding this problem is, instead of utilizing post-type insulating spacers, to use conical or disc spacers. These conical or disc spacers block the progress of arc products or contamination along the line. But the use of such conical or disc spacers present again the problem of having a large surface area upon which particles may collect and initiate flashover. Also, such spacers may restrict gas flow and evacuation, and are more expensive than the post-type insulating spacers.

SUMMARY OF THE INVENTION

The aforementioned problem in the prior art is minimized by this invention by providing a gas insulated transmission line section which comprises an elongated outer sheath at low potential and an elongated inner conductor disposed within the outer sheath. The inner conductor is at high potential with respect to the outer sheath, and is spaced-apart therefrom. Within the outer sheath is an insulating gas for electrically insulating the inner conductor from the outer sheath. A support insulator is disposed within the outer sheath for insulating and supporting the inner conductor, and a barrier insulator also supports the inner conductor within the outer sheath. The barrier insulator substantially fills in the cross-sectional area between the inner conductor and the outer sheath so as to substantially prevent arc product migration past the barrier insulator.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
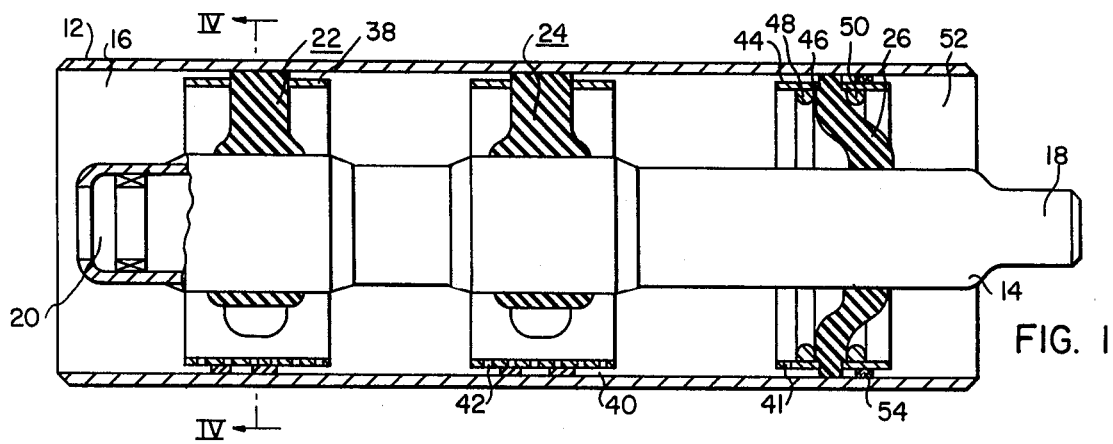
FIG. 1 is a sectional elevational view of a gas insulated transmission line section.

Referring now to FIG. 1, therein is shown a gas insulated transmission line section utilizing the teachings of this invention. The transmission line section comprises a generally elongated outer sheath 12 typically at low or ground potential and an elongated inner conductor 14 at high potential with respect to the outer sheath. The inner conductor 14 is disposed within, and spaced apart from, the outer sheath 12 and may carry voltages typically at 138KV or higher. Also disposed within the outer sheath 12 is an insulating gas 16 such as sulfur hexafluoride. The inner conductor 14 has two contact sections 18 and 20 which permit similar gas insulated transmission line sections to be connected to form a complete transmission line. Each transmission line section, for example, is 60 feet long.

Figure 4:
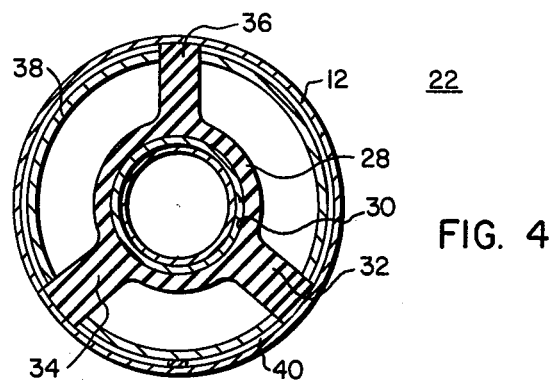
FIG. 4 is an end view taken along line IV—IV of FIG. 1.

Disposed within the outer sheath 12 are support insulators 22 and 24, and a barrier insulator 26. The support insulators 22 and 24 are post-type insulators illustrated in greater detail in FIG. 4. Therein it is shown that each insulator comprises a central portion 28 having a bore 30 therethrough. Extending radially outwardly from the central portion 28 are three legs 32, 34 and 36. The legs 32, 34 and 36 extend outwardly from the central portion 28 to contact the outer sheath 12. The legs 32, 34, 36 may be spaced equidistantly about the central portion 28, and support the inner conductor 14 which extends through the bore 30 of the central portion 28. A spacer ring 38 is secured to the legs 32, 34, 36, with the legs, or extensions secured to the legs extending through the spacer ring 38 to the outer sheath, and the spacer ring 38 and the outer sheath 12 form a space 40 therebetween. This space 40 contains a low field region which may be utilized for trapping loose conducting or semiconducting particles which may be present within the transmission line section. A plurality of apertures 42 (see FIG. 1) are disposed within the spacer ring 38, and any loose conducting or semiconducting particles which may be present within the transmission line section pass through the apertures 42 into the low field region 40 and are therein trapped and deactivated.

Also disposed within the outer sheath 12 and supporting the inner conductor 14 therein, is a barrier insulator 26. The barrier insulator, shown in FIG. 1 as being conically shaped, is also held within the outer sheath 12 by a spacer ring 44, and the ring 44 may have apertures 41 therein for particle trapping as heretofore explained. The barrier insulator 26 extends through an opening 46 in the spacer ring 44 and extends outwardly to the outer sheath 12. The barrier insulator 26 is prevented from longitudinal movement by fixture rings 48 and 50. The barrier insulator 26 substantially fills in the cross-sectional area 52 between the inner conductor 14 and the outer sheath 12 so as to substantially prevent any arc product migration past the barrier insulator 26. If it is so desired, the barrier insulator 26 may completely fill in the cross-sectional area 52 between the inner conductor 14 and the outer sheath 12 so as to prevent the passage of any insulating gas 16 past the barrier insulator 26. Such a configuration may then enable adjacent transmission line sections to be removed without the loss of the insulating gas from the entire line.

If, in order to aid in filling the transmission line section with insulating gas, or to aid in evacuation therefrom, it is desired to facilitate the movement of the insulating gas 16 from one transmission line section to the next, it is possible to position a porous material 54 on the outside of the ring 44. The porous material 54 would allow the insulating gas 16 to flow through the material 54 while preventing arc product migration past the barrier insulator 26.

Figure 2:
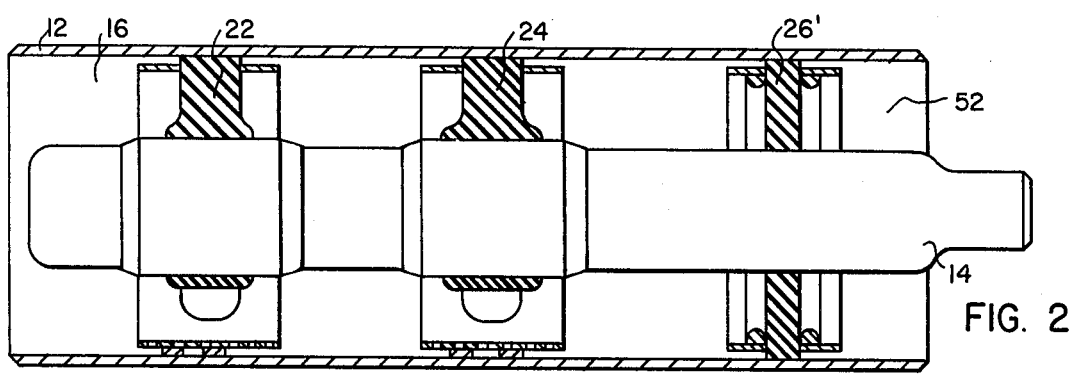
FIG. 2 is a modification of the transmission line section of FIG. 1.

Referring now to FIG. 2 therein is shown a modification of the transmission line section. The outer sheath 12, the inner conductor 14, insulating gas 16, and support insulators 22, 24 are the same as described in FIG. 1. However, in FIG. 2, the barrier insulator 26' is now disc-shaped instead of conically-shaped. The disc-shaped barrier insulator 26' as before, substantially fills in the cross-sectional area 52 between the inner conductor 14 and the outer sheath 12 so as to prevent arc product migration across the barrier insulator 26'.

Figure 3:
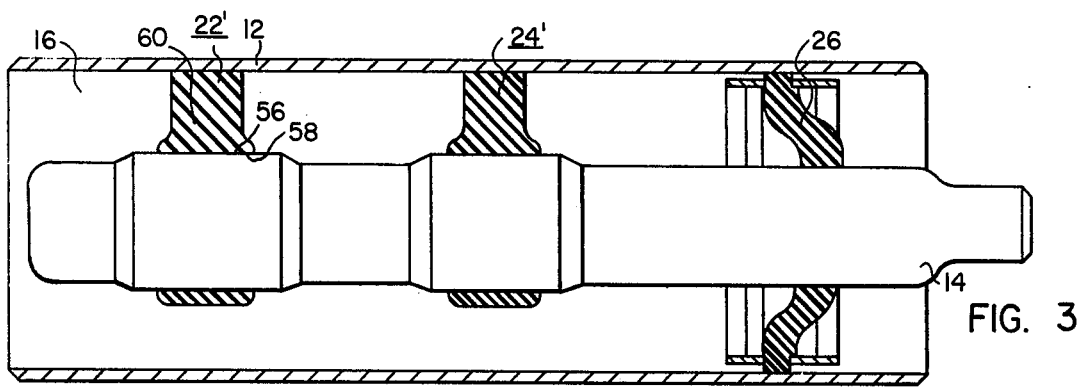
FIG. 3 is a modification of the transmission line section of FIG. 1.

Referring now to FIG. 3, therein is shown a further modification of the transmission line section illustrated in FIG. 1. In FIG. 3, the barrier insulator 26 is the conically-shaped barrier insulator 26 illustrated in FIG. 1. However, the support insulators 22', 24' are now single post insulators. These insulators 22', 24' comprise a central portion 56 which has a bore 58 therethrough through which the inner conductor 14 extends. Extending radially outwardly from the central portion 56 is a leg 60. This leg 60 is secured to the outer sheath 12, and supports the central portion 56 in a spaced-apart relationship to the outer sheath 12.

Although the transmission line sections in the drawings are illustrated as having only a single inner conductor 14, it is to be understood that this invention is equally applicable to those transmission line sections having a plurality of high voltage electrical conductors. Also, the differing types of support and barrier insulators may be interchanged within the transmission line section, so long as at least one barrier insulator is present within each transmission line section. Likewise, the barrier insulator may or may not, dependent upon the system designer's wishes, prevent the passage of insulating gas past itself. However, in all embodiments, the barrier insulator prevents arc product migration past the barrier insulator. Additionally, the complete transmission line may be fabricated utilizing the line sections of the invention in conjunction with other types of line sections so that, for example, only every second line section utilizes the line section of this invention.

We claim as our invention:

1. A gas insulated transmission line section comprising:
    an elongated outer sheath at low potential;
    an elongated inner conductor at high potential with respect to said outer sheath disposed within, and spaced apart from, said outer sheath;
    an insulating gas disposed within said outer sheath and electrically insulating said inner conductor from said outer sheath;
    a support insulator disposed within said outer sheath for insulatably supporting said inner conductor within said outer sheath, said support insulator comprising:
    a central portion having a bore therethrough, said inner conductor being disposed within said bore; and
    three legs secured to said central portion and extending radially outwardly to said outer sheath, said legs being disposed about said central portion;
    a first spacer ring secured to said legs and disposed adjacent said outer sheath, said first spacer ring and said outer sheath forming a low potential region therebetween, said first spacer ring having a plurality of apertures therethrough for the trapping of particles within said low potential region;
    a barrier insulator supporting said inner conductor within said outer sheath, said barrier insulator substantially filling in the cross-sectional area between said inner conductor and said outer sheath so as to substantially prevent arc product migration past said barrier insulator; and
    a second spacer ring secured to said barrier insulator and disposed adjacent said outer sheath, said second spacer ring and said outer sheath forming a low potential region therebetween, said second ring having a plurality of apertures therethrough for the trapping of particles within said low potential region.

2. The gas insulated transmission line section according to claim 1 wherein said barrier insulator completely fills in the cross-sectional area between said inner conductor and said outer sheath so as to prevent the passage of said insulating gas past said barrier insulator.

3. The gas insulated transmission line section according to claim 1 wherein said insulating gas is sulfur hexafluoride.

4. The gas insulated transmission line section according to claim 1 wherein said barrier insulator is disposed adjacent one end of said gas insulated transmission line section.

5. The gas insulated transmission line section according to claim 1 wherein said barrier insulator is of conical shape.

6. The gas insulated transmission line section according to claim 1 wherein said barrier insulator is disc-shaped.

7. The gas insulated transmission line section according to claim 1 including a porous material disposed intermediate said barrier insulator and said outer sheath, said porous material permitting the passage of said insulating gas past said barrier insulator and prohibiting the passage of arc products past said barrier insulator.

8. A gas insulated transmission line section comprising:
- an elongated outer sheath at low potential;
- an elongated inner conductor at high potential with respect to said outer sheath disposed within, and spaced apart from, said outer sheath;
- an insulating gas disposed within said outer sheath and electrically insulating said inner conductor from said outer sheath;
- a support insulator disposed within said outer sheath for insulatably supporting said inner conductor within said outer sheath, said support insulator comprising:
  - a central portion having a bore therethrough, said inner conductor being disposed within said bore; and
  - a leg secured to said central portion and said outer sheath, said leg supporting said central portion in a spaced-apart relationship with said outer sheath;
- a first spacer ring secured to said leg and disposed adjacent said outer sheath, said first spacer ring and said outer sheath forming a low potential region therebetween, said first ring having a plurality of apertures therethrough for the trapping of particles within said low potential region;
- a barrier insulator supporting said inner conductor within said outer sheath, said barrier insulator substantially filling in the cross-sectional area between said inner conductor and said outer sheath so as to substantially prevent arc product migration past said barrier insulator; and
- a second spacer ring secured to said barrier insulator and disposed adjacent said outer sheath, said second spacer ring and said outer sheath forming a low potential region therebetween, said second ring having a plurality of apertures therethrough for the trapping of particles within said low potential region.

* * * * *